Figure 1:
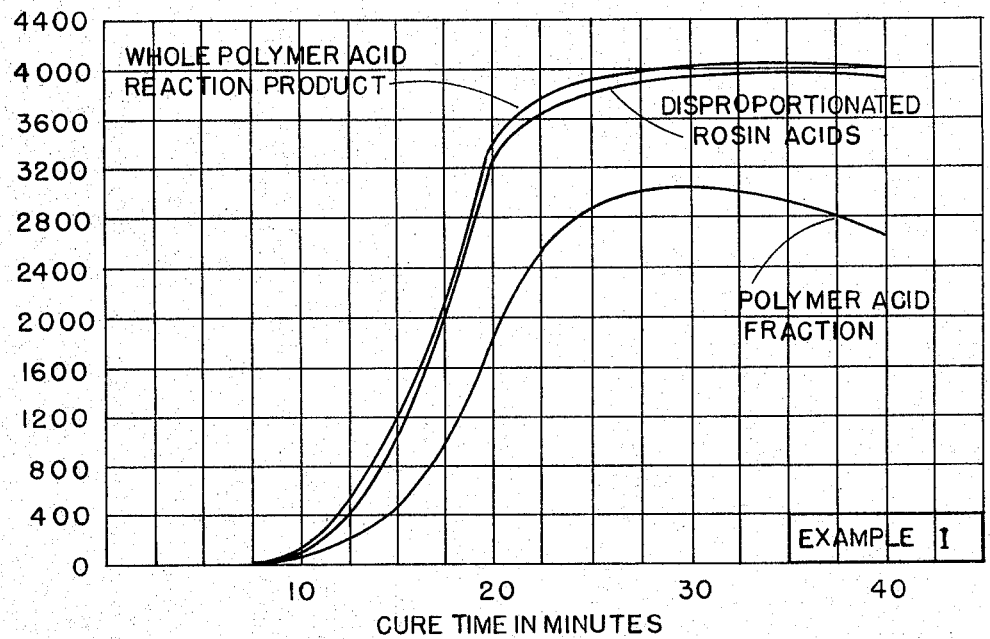

LATIMER D. MYERS
INVENTOR.

United States Patent Office 3,301,802
Patented Jan. 31, 1967

3,301,802
COMPOSITIONS COMPRISING BUTADIENE-STYRENE RUBBER AND POLYMERIZED FATTY ACIDS
Latimer D. Myers, Cincinnati, Ohio, assignor to Emery Industries, Inc., Cincinnati, Ohio, a corporation of Ohio
Filed Apr. 13, 1962, Ser. No. 187,348
3 Claims. (Cl. 260—23.7)

This invention relates to the emulsion polymerization of synthetic rubbers, and it is particularly directed to the provision of an improved emulsification agent for use in said process. Briefly described, the process of the invention is one wherein appropriate monomers such as styrene and butadiene are polymerized in the presence of an emulsification agent comprising an alkali soap of the whole product obtained on polymerizing mixtures of unsaturated fatty acids in the presence of water and a surface-active clay mineral. The present application is a continuation-in-part of my earlier filed application, Serial No. 854,555, filed November 23, 1959, now abandoned.

Synthetic rubber is conventionally produced by emulsifying polymerizable monomer compounds in an aqueous medium by means of an emulsifying agent made up of a suitable soap, the ensuing polymerization thereafter being induced at controlled temperatures in the presence of a catalyst and other conventional additives. The polymerization is generally "short-stopped" before complete conversion has taken place, the usual practice being to stop the reaction at about a 60% conversion level by the addition of an agent such as sodium dimethyl dithiocarbamate. The unreacted monomers remaining in the mixture are then distilled off, leaving a latex which is salted out and then coagulated by addition of mineral acid to break the soap into free fatty acid and a mineral acid salt. The coagulated latex is then washed and dried, leaving a product which retains the acid portion of the soap emulsifier. This residual fatty acid makes a significant contribution to the ensuing curing and handling characteristics of the rubber.

So-called "hot" rubber is produced by polymerizing butadiene and styrene at 122° F. in the presence of alkali soaps of hydrogenated tallow acids as the emulsifier. A superior product known as "cold" rubber is produced when the temperature of the polymerization reaction is maintained at about 41° F. However, the hydrogenated tallow soaps used as emulsifiers in the hot rubber process are not suitable for use in the newer, low temperature recipes due to their limited solubility. Thus, in the polymerization step, these soaps lead to gelation with resultant poor fluidity and inadequate latex heat transfer. Quite apart from the factor of poor solubility, the use of hydrogenated tallow soaps in either the hot or the cold polymerization process adversely affects the finished properties of the rubber, notably as regards tack and the rate, or type of cure.

Tack is the peculiar characteristic of rubber which causes two fresh surfaces to adhere or coalesce. It is by virtue of this property that composite rubber articles such as tires are built. The surface are freshened with a suitable solvent, stuck together and rolled into place, and the adjacent elements, such as plies and tread splice must thereafter hold together during subsequent handling. Rubbers made from hydrogenated tallow acids have an inherent lack of tackiness which limits their usefulness in the composite rubber article field.

The type of cure that the soap acids give to the rubber is also important. Rubber that is used in the production of items such as tires should have a "plateau" type of cure. With this type of cure, the curve of the tensile strength plotted against the time of cure is flattened out; that is to say, the tensile properties of the rubber remain at a high, near optimum value for a considerable period of time as the curing operation progresses. When a tire is cured, the rubber portions near the mold reach curing temperature very quickly after the mold is closed. On the other hand, because of the low rate of heat transfer through the rubber the central portions of the tire will not reach curing temperature for some time. Therefore, the rubber portions adjacent the mold must retain their optimum properties until the rubber at the center of the tire has reached curing temperatures. Rubbers made from hydrogenated tallow acids reach their optimum tensile properties very quickly and then regress. When used in tire production, this type of rubber tends to overcure at the outside before the central portions reach the curing temperature.

In view of the deficiencies of the hydrogenated tallow soaps, the art has turned in recent years to the use of soaps of disproportionated rosin acids. These soaps have good solubility and thus manifest a high degree of fluidity even at temperatures as low as 41° F. Although they have the disadvantage of giving a much slower rate of polymerization than do the tallow soaps, they provide the desired plateau type of cure, particularly when a small amount of stearic acid is used in the compounding recipe.

Rosin soap emulsifiers also lead to the formation of a rubber polymer which exhibits a high degree of tack. Unfortunately, however, the tack is of such a nature as to give rise to handling difficulties due to the overly pronounced tendency of the stock to adhere to the various mill and calender roll surfaces employed in working up the rubber.

To minimize the poor qualities of both the tallow and the rosin soap systems, and to take limited advantage of the better qualities of each, soaps containing a 50/50 mixture of disproportionated rosin and of hydrogenated tallow acids have now come into widespread use. Such mixtures are, nevertheless, deficient as regards tack and the desired plateau type of cure. Moreover, the mixture has poor solubility and thus gives rise to low temperature operating difficulties.

It is an object of this invention to provide a low cost emulsifier of the soap type which has good solubility characteristics and which permits of the rapid polymerization of either hot or cold rubber without difficulty. A further object is to provide an emulsifier of this character wherein the acid portion, as retained in the rubber after coagulation, will impart good building tack without undue stickiness and will also give a plateau type of cure to the rubber. The nature of still other objects of the invention will be apparent from a consideration of the descriptive portion to follow.

We have found that the foregoing objects are achieved by effecting the rubber polymerization in the presence of an emulsifying agent comprised of an alkali soap of substantially the entire reaction product obtained by polymerizing $C_{18}$ unsaturated fatty acids, or fatty acid mixtures containing at least about 40% of said acids, in the presence of a crystalline clay mineral and water. Acid polymerization process of this character are described in U.S. Patents Nos. 2,793,219, 2,793,220, and 2,955,121. The polymerized reaction mixtures so obtained contain from about 30 to 75% by weight of acid polymers (mostly acid dimer with some trimer), with the balance of the mixture comprising monomeric (i.e., $C_{18}$) fatty acids having a structure somewhat modified as compared with that of the acid monomers used as the starting materials.

The soaps employed as emulsifiers in accordance with the present invention are those of said polymer acid-containing reaction products and an alkali, the latter term including the various alkali metals such as sodium and potassium, as well as ammonia. These soaps have been found to have good solubility and are capable of inducing fast rubber polymerization rates. They facilitate the production of both cold and hot rubbers. At the same time, the acid portion of the soap which is retained in the rubber after coagulation imparts excellent tack without undue roll stickiness and gives a good curing action having a well defined plateau type of cure. Other advantages which have been observed include the enhanced ease of handling of the emulsifier in actual plant operations and the retention of a light color by the finished rubber even after prolonged heat aging treatments.

The art, notably U.S. Patent No. 2,876,203, discloses the use in rubber polymerization of a soap prepared from the acid polymer fraction of the whole reaction product used in a practice of this invention. Polymer fractions of this character normally contain but a few percent of monomer, usually of the order of 1–3%, and in any event below 10%. However, use of these acid polymer soaps is limited, from a practical standpoint, to operations wherein the resulting rubber latex is to be employed in the formation of sponges and the like, for when a dry rubber is to be obtained the polymer acids which remain in the rubber following coagulation and washing drastically decrease the rate of cure and impart to the rubber a type of cure that is commercially unacceptable. In this connection see "Some Variables Affecting Modulus of GR–S," W. K. Taft, et. al., Rubber Age, July 1956, pages 619–624 (624). On the other hand, the situation is otherwise when the soap employed is that of the whole polymerized fatty acid reaction product as described herein.

In forming the polymerized fatty acid reaction product which, in turn, is converted to a soap for use as an emulsifier in accordance with this invention, there is employed as the starting material an unsaturated fatty acid composition derived from natural fats and oils such as the mixture of fatty acids distilled from tall oil or that which is derived by the splitting of a natural glyceride such as safflower, soybean, corn, sunflower seed, peanut, linseed or tung oil, or by the splitting of tallow or other animal fat or oil. These acids, or acid mixtures, contain at least 40% of $C_{18}$, unsaturated, aliphatic carboxylic acids such as oleic acid, linoleic acid, linolenic acid, eleostearic acid and the like. They also contain varying amounts of saturated fatty acids such as palmitic and stearic acids, as a general rule. These mixtures can be employed as such as the starting materials to be polymerized, or they can be separated so as to recover particular acids or acid fractions which are then to be polymerized. In any event, the acid starting material should contain at least 40% by weight of unsaturated fatty acids.

The mixture of fatty acids recovered by distillation from tall oil comprises the preferred acidic starting material, said product being made up essentially of unsaturated fatty acids. Good results can also be obtained with the mixture of fatty acids derived on the splitting of tallow, the latter mixture normally containing from about 40 to 60% of unsaturated acids.

Whatever the nature of the fatty acid starting material, the polymer-containing reaction product used to form the soap emulsifier is formed by heating the fatty material at temperatures of from about 180 to 260° C. for a period of at least ½ hour in the presence of water and a surface-active, crystalline clay mineral. In carrying out this step, a suitable reaction vessel is charged with the acids to be polymerized, a clay mineral and water, the latter being supplied, in some instances, along with the clay. The vessel is then heated to polymerization temperatures, preferably under elevated pressure in order to retain in the reaction mixture at least a portion of the water present in the system.

The clay minerals which may be used for this purpose are the crystalline, surface-active clay minerals such as montmorillonite, hectorite, halloysite, attapulgite and sepiolite. Various of the montmorillonite-rich bentonites may also be used. In general, clay minerals of the montmorillonite type constitute a preferred class for use herein. The amount of clay mineral employed in the reaction mixture may range from about 1 to 20% of the weight of the fatty acids, though from a practical operating standpoint, a preferred range is from 2 to 6%.

The amount of water incorporated in the reaction mixture usually ranges from about 0.5 to 5% in terms of the weight of fatty acids present, though good results may be obtained with somewhat lesser amounts, particularly if the free space in the vessel is kept to a minimum. In some cases the water content of the clay itself may be sufficient to promote the reaction. As a conventional practice, water is maintained in the reaction mixture as the reaction progresses by closing the vessel and allowing steam pressure to build up therein.

The process of fatty acid polymerization as described above forms the subject of U.S. Patents Nos. 2,793,219 and 2,793,220. If desired, the clay mineral-catalyzed reaction step may also be conducted in the presence of a small amount of an alkali material (e.g., alkali or alkaline earth metal oxides, hydroxides or carbonates), the alkali being added either as a separate component, as a component of the clay (certain clays containing available alkali), or in the form of a fatty acid soap. Polymerization conducted in this fashion forms the subject of U.S. Patent No. 2,955,121.

As indicated above, polymerization of the fatty acid starting material can be effected at temperatures ranging from about 180 to 260° C. However, a preferred temperature range is from about 220 to 250° C. While a satisfactory degree of polymerization for the purposes of this invention may occur within a reaction period as short as 0.5 to 1 hour, the recommended practice is to continue the heating until the acid number of the product reaches a relatively high and stable level. For this purpose, heating periods of from 3 to 6 hours are commonly employed. Once the reaction has been completed, the charge is cooled and (in runs operated at elevated pressures) the pressure is released to permit flashing of the water.

The polymeric reaction mixtures prepared as described above contained from about 30 to 75% by weight of acid polymer, with the balance of the mixture representing acid monomer of a modified molecular structure. All such reaction mixtures have utility as emulsifiers in the process of this invention when converted to the corresponding alkali soap form. In the case of some products as, for example, those prepared from tallow acids (where the resultant polymerized reaction mixture may consist of a major portion of said monomers) it may be desirable to distill off a portion of the monomer before converting the residue to the soap form. In any event, whether or not some small proportion of the monomer be so removed, the product mixture used in forming the soap emulsifier should contain at least 25% by weight of monomer, with the balance being essentially composed of acid polymer.

The conversion of the acid polymer reaction mixture to the alkali soap form is effected in the conventional manner, the usual practice being to determine the saponification number of the mixture and then to add the calculated amount of the alkali component. Readily available compounds may be used to effect saponification as, for example, sodium hydroxide, potassium hydroxide or ammonium hydroxide.

Examples of monomer compounds which can be emulsion polymerized to synthetic rubber in accordance with the present invention are the various conjugated dienes including 1,3-butadiene, isoprene, piperylene and 2,3-dimethylbutadiene-1,3. If desired, the polymerizable starting material may be a mixture of a diene (such as 1,3-butadiene) with a monoethylenically unsaturated compound which is capable of forming a copolymer with said diene. For example, such polymerizable mixtures may contain up to 50% (or even more in some instances) of a compound such as isobutylene or one which contains a $CH_2=C<$ group wherein at least one of the disconnected valences is attached to an electro-active group, i.e., a group which substantially increases the electrical dissymmetry or polar character of the molecule. Examples of compounds containing the aforementioned group and copolymerizable with 1,3-butadiene, for example, are the arylolefins such as styrene and vinylnaphthalene; the alpha-methylene carboxylic acids and their esters, nitriles and amides such as acrylic acid, methyl acrylate, methyl methacrylate, acrylonitrile, methacrylonitrile, and methacrylamide; methyl vinyl ether; and methyl vinyl ketone. Synthetic rubbers prepared from polymerizable materials as described herein may be referred to as those of the group consisting of rubbery homopolymers of conjugated dienes and of rubbery copolymers of conjugated dienes and monoethylenically unsaturated monomers. The preferred polymerizable material is a mixture of 1,3-butadiene and styrene.

The amounts of the present soap emulsifiers to be employed in the rubber emulsification process are essentially the same as is the case when soaps of tallow and/or of rosin derivation are used, said amounts being of the order of about 2 to 6 parts per 100 parts of rubber monomer in most polymerization operations. The steps of polymerizing the emulsified monomers, of salting out and coagulating the resulting latex and of washing the coagulated material to obtain a rubbery polymer (which contains the acid portion of the soap emulsifier) are all conducted in the usual fashion. Inasmuch as the rubber polymerization step is normally terminated at a 60% conversion level, the resulting coagulated, rubbery polymer will contain on the order of about 3 to 10 parts of the acid (originally present in the soap) per 100 parts of rubber.

The following examples illustrate the present invention in various of its embodiments:

Example I

This example presents data obtained by curing a standard, SBR-1500 type of rubber (70% butadiene, 30% styrene), as admixed with various fatty acids of the type employed as emulsifying agents (in the salt form), together with other conventional rubber curing additives. The rubber test material employed had been prepared in the normal fashion by polymerizing the butadiene/styrene mixture in the presence of a disproportionated rosin acid soap, the reaction being terminated as the conversion reached 60%. The soap emulsifier was then completely removed from the latex dispersion by adding the latter to 91% isopropanol with rapid agitation, the alcohol acting to dissolve out the soap. The material was then filtered, water-washed and dried. The particular fatty acid under test was then added to the dry crumb as it was given an initial breakdown on the mill before being compounded (ASTM method D15-55).

The fatty acid materials tested were (1) the total reaction product obtained by the catalytic polymerization of tall oil fatty acids, (2) the polymer portion of said total reaction product, as recovered after distilling off the monomer component, and (3) a commercially available disproportionated rosin acid of the type widely used in synthetic rubber production. The first of these acids (the only one involving a practice of this invention) was prepared by reacting tall oil fatty acids along with 1% water and 4% Filtrol (a surface-active clay material of the montmorillonite type) in an autoclave for 4 hours at 230° C. The tall oil fatty acids so employed had an I.V. of 131, a polyunsaturated acid content of 38.9% and a total unsaturated acid content of about 97%. At the conclusion of the polymerization treatment the autoclave was opened and the product was filtered to remove contained clay. The total reaction product thus recovered, which contained about 1% of polyunsaturated acids, was made up of about 60% polymer acids and 40% of monomer acid components.

The second of the acids tested was recovered from the whole reaction mixture described above by distilling off the monomer component in vacuo (1 mm. Hg) at 270° C.

The three batches of rubber were then compounded using the following recipe:

| | Parts by weight |
|---|---|
| Extracted SBR | 94.5 |
| Fatty acid | 5.5 |
| High abrasion furnace carbon black | 50.0 |
| Zinc oxide | 3 |
| Santocure (N-cyclohexyl - 2 - benzothiazole sulfinamide | 1 |
| Stearic acid | 1 |
| Sulfur | 1.75 |

The compounded batches of rubber were then cured at 292° F. for periods of time ranging from 10 to 40 minutes. The tensile strength of each sample was determined according to ASTM method D412-51T, the readings so obtained being plotted against time of cure to obtain the curves which are set forth in FIG. 1 of the accompanying drawing. It will be seen from said figure that the second of the acids tested (the acid polymer fraction, per se) acted as a cure suppressant. On the other hand, the whole polymer acid reaction product had the same highly desirable type of cure as was manifested by the disproportionated rosin acids.

Example II

In this operation sodium and potassium soaps were prepared from five fatty acid compositions, and data was obtained as to the solubility of said soaps in water at room temperatures. Acid (A) was prepared according to a standard hydrogenation procedure whereby tallow fatty acids having a titer of 41.5° F. and a polyunsaturated acid content of 4.7% were heated in an autoclave with 0.16% nickel catalyst at 375° F. under 300 p.s.i.g. hydrogen pressure. The catalyst was then filtered from the resulting product which now had a polyunsaturated content of 0.8%. The product contained no acid polymer. Acid (B) was prepared from the same tallow fatty acid mixture, the method here employed involving polymerizing said acids in an autoclave along with 2% water and 4% crystalline clay material (Filtrol grade 20) for 4 hours at 230° C. On filtering off the clay there was obtained a product which had a polyunsaturated acid content of 0.79% and a polymerized acid content of 30%. Acid (C) represented the whole polymerized action product obtained by the polymerization of tall oil fatty acids, the method of preparation being that described above in Example I. Acid (D) was a commercially available, disproportionated rosin of the type widely used in synthetic rubber production (Dresinate 731). Acid (E) represented a mixture of equal parts of acids (A) and (D).

The solubility of the respective sodium and potassium soaps of the acids described above was then determined by adding 2.5%, 5%, 10% and 20% of each acid to water at room temperatures. The characteristics of the resulting systems are given below in Table 1.

As evidenced by the above data, the soaps of acids B and C display much the same solubility characteristics as do soaps of disproportionated rosin acids or those of mixtures of disproportionated rosin and hydrogenated tallow acids. On the other hand, soaps of hydrogenated tallow acids lack these good solubility characteristics.

carbamate. The times required to reach 60% conversion were as follows:

| | Hours |
|---|---|
| Soap of Acid A (hydrogenated tallow acids) | 9 |
| Soap of Acid B (total tallow acid polymer product) | 9 |
| Soap of Acid C (total tall oil acid polymer product) | 10 |
| Soap of Acid D (disproportionated rosin acids) | 14 |
| Soap of Acid E (50/50 mix of A and D) | 10 |

TABLE 1.—SOLUBILITY OF EMULSIFIER SOAPS IN WATER

| Acid | Concentration of Potassium Soap | | | |
|---|---|---|---|---|
| | 2.5% | 5% | 10% | 20% |
| A | Clear Liquid | Liquid with Slight Settling. | Liquid with Considerable Settling. | Semi-Solid. |
| B | do | Clear Liquid | Clera Liquid | Clear Liquid. |
| C | do | do | do | Do. |
| D | do | do | do | Do. |
| E | Slightly Cloudy | Slightly Cloudy | Cloudy Liquid with Slight Settling. | Cloudy with Settling. |

| Acid | Concen ration of Sodium Salt | | | |
|---|---|---|---|---|
| | 2.5% | 5% | 10% | 20% |
| A | Thixotropic Gel | Solid | Solid | Solid. |
| B | Cloudy Liquid | Thixotropic Gel | Gel | Do. |
| C | Liquid | Liquid | Liquid | Liquid. |
| D | do | do | do | Do. |
| E | Thixotropic Gel | Gel | Gel | Solid. |

*Example III*

Soaps of the acids described in Example II (sodium salts of acids B, C and D, and potassium soaps of acids A and E) were used as emulsifying agents in polymerizing a mixture containing 70% butadiene and 30% styrene using the following recipe:

| | Parts by weight |
|---|---|
| Water | 200 |
| Butadiene | 70 |
| Styrene | 30 |
| Soap | 4.5 |
| $Na_3PO_4 \cdot 12H_2O$ | 0.8 |
| Tamol N (sodium aryl sulfonate) | 0.15 |
| Sodium formaldehyde sulfoxylate | 0.15 |
| $FeSO_4 \cdot 7H_2O$ | 0.05 |
| Versene (tetrasodium salt of ethylene diamine tetraacetic acid) | 0.07 |
| p-Menthane hydroperoxide | 0.10 |
| Tert-dodecyl mercaptan | 0.20 |

Polymerization of the above recipe was effected at 41° F. using standard methods. Samples were taken at regular intervals and the time required to reach 60% conversion was recorded, the reaction being shortstopped at this point by adding 0.15 part sodium dimethyl dithio- From the above data it will be seen that acids B and C, those used in a practice of this invention, give polymerizing times about as low as the hydrogenated tallow acids, which normally excel in this particular, and far lower than those obtained with the disproportionated rosin acid soap.

*Example IV*

In this operation the latices formed in Example III above were coagulated with a salt/acid coagulant and then washed and dried. The resulting polymers (identified by the letters A, B, C, D and E to correspond with the fatty acids contained therein, as identified in said example) were compounded according to the following recipe:

| | Parts by weight |
|---|---|
| Polymer | 100 |
| HAF carbon black | 50 |
| Zinc oxide | 3 |
| Stearic acid | 2 |
| Santocure | 1 |
| Sulfur | 1.75 |

The respective compounded rubbers were then milled on a standard rubber mill in the conventional manner. The tack of the uncured rubber was observed both on the mill and off, the tack properties so observed being reported below in Table 2.

TABLE 2.—TACK PROPERTIES OF UNCURED RUBBER

| Polymer | On Mill | Off Mill |
|---|---|---|
| A | No tack, sagged from mill | No tack, sheets would not stick together. |
| B | Fair tack, did not sag from mill | Fair tack, sheets stuck together without much pressure. |
| C | Good tack, stuck to mill but was not difficult to remove. | Excellent tack, very difficult to pull sheet apart that had been laid one on top of the other. |
| D | Very tacky, stuck to mill and was difficult to remove. | Excellent tack, very difficult to pull sheets apart that had been laid one on top of the other. |
| E | Fair tack, did not sag from mill | Fair tack, sheets stuck together without much pressure. |

It will be seen from the data presented above that rubbers formed from polymers B and C, representing those of the present invention, exhibited good all around tack properties, though that of the tall oil soap (which contained 60% of dimer acid) was decidedly superior to that of the soap prepared from tallow acid polymer containing but 30% of polymeric acids. Thus, while the polymerized tallow acids are at least as good as the mixed acids of polymer E, the tall oil acid polymer product has tackiness characteristics which are even superior to those obtained with polymer D based on disproportionated rosin acids, the superiority being evidenced by freedom from undue adherence to the mill rolls.

*Example V*

Figure 2:
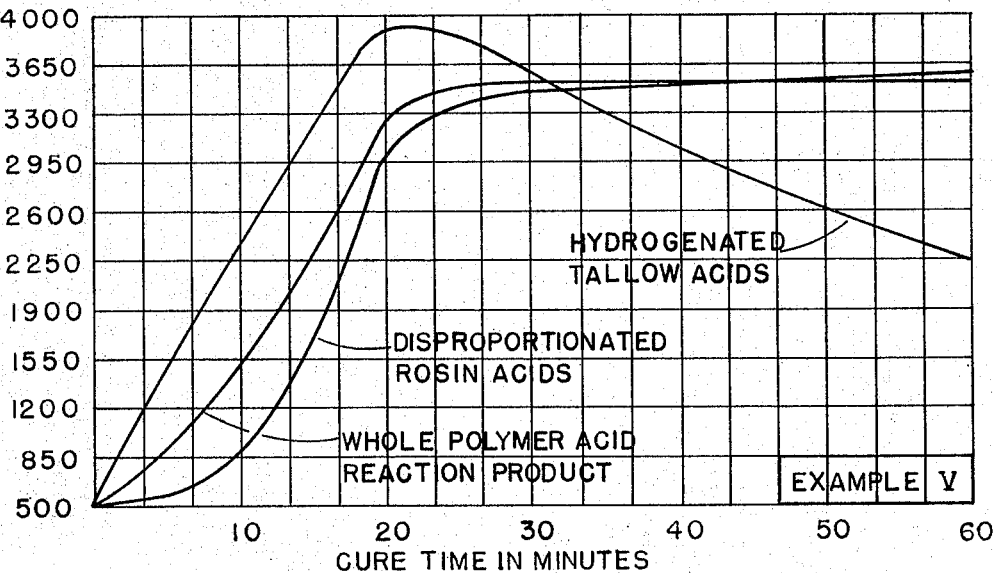

The compounded polymers A, C and D of Example IV were cured at 292° F. using various cure times ranging in length from 10 to 60 minutes. The tensile strength of each sample was determined according to ASTM Method D 412–51T, the readings so obtained being plotted against time of cure to obtain the curves which are set forth in FIG. 2 of the accompanying drawing. It will be seen from said figure that rubbers containing polymer acid reaction product, as described herein, have substantially the same characteristics from a cure standpoint as do those prepared with disproportionated rosin acids. Specifically, each of said rubbers retains high tensile strength for a long period of time. On the other hand, rubbers incorporating hydrogenated tallow acids reach their optimum tensile strength very quickly and then rapidly regress, a condition which leads to overcuring of the outer portions of the rubber article in the mold.

*Example VI*

Polymers B, C, D, and E, as prepared above in Example IV, were compounded with conventional rubber curing additives and then cured at 292° F. for 25, 50 and 100 minutes. Polymers C and D were compounded in accordance with the conventional test recipe for evaluating SBR–1500 type rubbers (as prepared using disproportionated rosin acid soaps), the formulation being as follows:

| | Parts by weight |
|---|---|
| Polymer | 100.0 |
| Easy processing channel carbon black | 40.0 |
| Zinc oxide | 5.0 |
| Stearic acid | 1.5 |
| Sulfur | 2.0 |
| MBTS (Benzothiazyldisulfide) | 3.0 |

Polymers B and E were formulated in accordance with the conventional test recipe for evaluating SBR–1502 type rubbers (as prepared using mixed hydrogenated tallow acid and disproportionated rosin acid soaps), the recipe being as follows:

| | Parts by weight |
|---|---|
| Polymer | 100.0 |
| Easy processing channel carbon black | 40.0 |
| Zinc oxide | 5.0 |
| Sulfur | 2.0 |
| MBTS | 2.0 |

The physical characteristics of the cured rubbers described above are as follows:

TABLE 3.—PHYSICAL PROPERTIES OF CURED, COMPOUNDED RUBBER

| Test | Polymer C | Polymer D | Polymer B | Polymer E |
|---|---|---|---|---|
| Compounded Viscosity, ML$_4$ at 212° F | 58 | 61 | 64.0 | 64.0 |
| Ultimate Tensile, p.s.i., 50 minute cure | 4,060 | 4,140 | 3,840 | 3,800 |
| Ultimate Elongation, percent, 50 minute cure | 610 | 670 | 730 | 730 |
| 300% Modulus, p.s.i.: | | | | |
| 25 minute cure | 600 | 550 | 490 | 480 |
| 50 minute cure | 1,100 | 1,050 | 830 | 820 |
| 100 minute cure | 1,450 | 1,420 | 1,420 | 1,380 |

The data of Table 3 above disclose that fatty acid polymer mixtures (polymer B) containing a relatively low percentage of polymer acids have physical properties generally similar to those obtained by using a 50/50 mixture of hydrogenated tallow acids and disproportionated rosin acids (polymer E). Those rubbers prepared from acid polymer mixtures high in acid polymer content (polymer C) have characteristics which are similar to those obtained by using disproportionated rosin acids alone (polymer D).

The alkali soap emulsifying agents disclosed herein are compatible with the other soaps now in use for rubber polymerization and can be employed in conjunction therewith in any given polymerization operation. Such auxiliary soaps include those of hydrogenated tallow acids, of disproportionated whole tall oil and disproportionated rosin acids, and of various fatty acids, including oleic acid. In general, the benefits of the present invention can be obtained in substantial measure with a mixture which contains at least about 50% of the whole polymer acid reaction products described herein. The benefits of using less than this amount can only be assessed by actual trial runs of any proposed mixture of soapy emulsifiers.

I claim:
1. A rubbery polymer composition having good rubber curing characteristics, said composition comprising a rubbery polymer formed by the emulsion polymerization of 1,3-butadiene and styrene, together with from about 3 to 10% of a product, as a processing aid, obtained on polymerizing higher fatty acids containing at least 40% of C$_{18}$ unsaturated fatty acids in the presence of water and a crystalline clay mineral, said product containing from about 30 to 75% of a higher fatty acid polymer with the balance being essentially comprised of monomeric fatty acids.

2. The composition of claim 1 wherein the product contained in the rubbery polymer is one formed on polymerizing distilled tall oil fatty acids.

3. The composition of claim 1 wherein the product contained in the rubbery polymer is one formed on polymerizing a mixture of fatty acids as derived on the splitting of tallow.

References Cited by the Examiner

UNITED STATES PATENTS

| | | | |
|---|---|---|---|
| 2,379,413 | 7/1945 | Bradley | 260—18 XR |
| 2,721,185 | 10/1955 | Schulze et al. | 260—27 |
| 2,793,219 | 5/1957 | Barrett et al. | 260—407 |
| 2,793,220 | 5/1957 | Barrett et al. | 260—407 |
| 2,876,203 | 3/1959 | Miller et al. | 260—23 |

OTHER REFERENCES

Turner: "The Condensed Chemical Dictionary," (1950), p. 644.

Whitby: "Synthetic Rubber," (1954), pp. 249 and 250.

Wilson et al.: Industrial and Engineering Chemistry, vol. 40, March 1948, pp. 530–534.

DONALD E. CZAJA, *Primary Examiner.*

LEON J. BERCOVITZ, *Examiner.*

T. D. KERWIN, R. A. WHITE, *Assistant Examiners.*